June 24, 1969  M. H. NORMANDIN  3,451,524

DEVICE FOR INVERTING REVERSED ARTICLES

Filed Sept. 6, 1967

INVENTOR
Marcel H. NORMANDIN

ATTORNEY

United States Patent Office 3,451,524
Patented June 24, 1969

3,451,524
DEVICE FOR INVERTING REVERSED ARTICLES
Marcel H. Normandin, Montreal, Quebec, Canada, assignor to Diemakers Limited, Montreal, Quebec, Canada
Filed Sept. 6, 1967, Ser. No. 665,932
Int. Cl. B65g 47/24, 11/20; B23q 7/12
U.S. Cl. 198—33                                       8 Claims

ABSTRACT OF THE DISCLOSURE

The device is especially adapted for inverting upstanding reversed articles such as bushings or the like. It generally comprises a feeding chute for feeding the upstanding articles in a disorderly manner, a turntable for conveying the articles standing head up to a discarding chute and those standing head down to an inverting rotor. The rotor picks up the reversed articles but let go of those standing head up. The reversed articles picked up by the rotor are inverted, fed into a return chute and then into the discarding chute in the head up position. Preferably, the rotor comprises spring loaded finger capable of intercepting the reversed articles.

BACKGROUND OF THE INVENTION

Field of the invention

This invention relates to a device for inverting articles which are conveyed head down in reversed position. More particularly, the invention is concerned with an apparatus for reversing the position of upstanding bushings having a large diameter and a small diameter and wherein some of the said bushings are conveyed with their small diameter facing up in reversed position.

Description of the prior art

Many small articles such as bushings or the like are required in the construction of mass produced apparatus. Some of these articles are upright and cannot be used indifferently head up or head down. Such is the case with bushing or other ring-like articles having different diameters at both ends thereof. Up to now it has not been possible to resort to an automatic device which could provide a uniform arrangement of all of these articles. Usually, these articles are rearranged by hand and are thereafter fed to the automatic device which will mount these articles on the mass produced apparatus.

This operation is long and tedious and may cause interruptions of the assembly line due to an error on the part of the manual worker. It may even slow down the assembly line when the operator is delayed for any reason. To our knowledge, up to now, there is no available device which could automatically reverse the position of upright articles standing head down.

SUMMARY OF THE INVENTION

It has been found that these disadvantages may be overcome by providing in a machine for conveying upright articles wherein some of the articles are conveyed head down in reversed position, a device for inverting the reversed articles comprising a horizontal turntable formed with means at the periphery thereof for conveying the upright articles, a vertical rotor disposed above the periphery of the turntable, means at the periphery of the rotor for gripping reversed articles as they move beneath the rotor, the reversed articles thus being brought into rotation by the rotor, means to feed upright articles to the turntable and means to discharge the articles from the said turntable. The feeding of discharge means are disposed on either side of the rotor. The device further comprised releasing means at the top of the rotor for freeing the gripped articles from the gripping means, said means including carrying means to carry the released articles into the discharge means.

BRIEF DESCRIPTION OF THE DRAWING

In the drawing which illustrates an embodiment according to the invention.

DESCRIPTION OF THE PREFERRED EMBODIMENT

Figure 1:
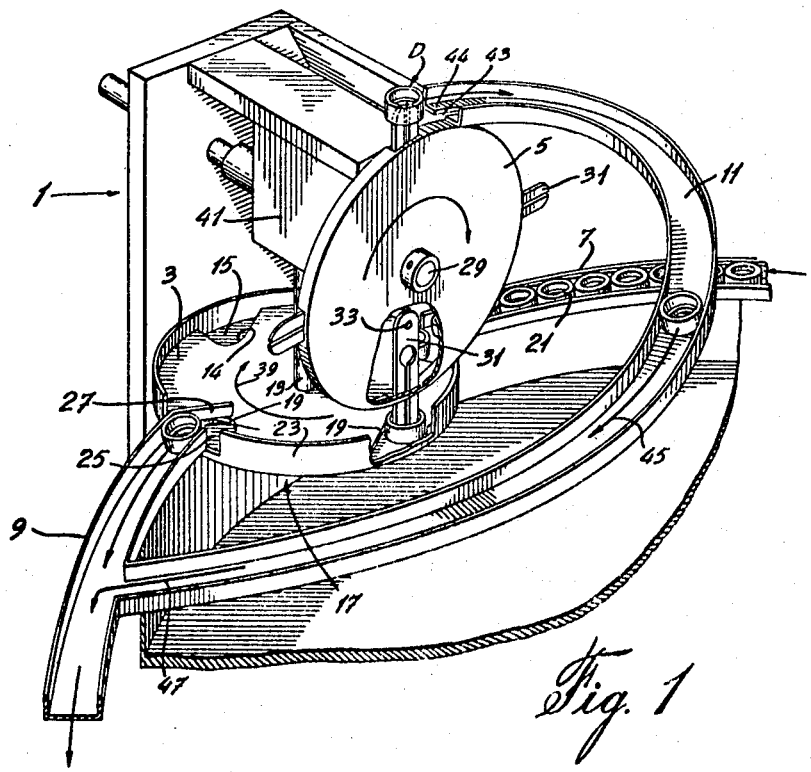
FIGURE 1 is a perspective view of the device according to the invention.

Referring to the drawing, the inverting device 1, according to the invention, generally comprises a turntable 3, a rotor 5, a feeding chute 7, a discarding chute 9 and a return chute 11. The turntable 3 is mounted at the lower end of a shaft 13 at a very short distance above the floor 15 of a circular container 17. The turntable 3 is provided at the periphery thereof with the notches 19 which are in the particular shape illustrated in FIGURE 1. The purpose of these notches is to receive the bushings 21 from the feeding chute 7 and to convey those standing head up to the discarding chute 9. The circular container 17 is provided at the periphery thereof with a circular flange 23 which will serve as a guard against which the bushings 21 are conveyed while being rotated by the turntable 3. The flange 23 is provided with two openings respectively for the entrance and the exit of the bushings 21. The entrance opening is not shown in the drawing. The exit is illustrated at 25 and also comprises a guide blade 27. The guide blade 27 stops the conveying movement of the bushing and discards it into the feeding chute 9. Perpendicularly to the turntable 3 and mounted at the end of the shaft 29, the device also comprises a rotor 5 which is provided at the periphery thereof with four spring loaded fingers 31. Each spring loaded finger comprises a strip of metal having its inner end fixedly mounted at 33 on the rotor 5. The resilient action in the finger is provided by means of the elongated slit 35 provided longitudinally thereon and terminated into a circular cut out portion 37. It will be realized that the finger 31 could be snugly inserted into an opening having a diameter smaller than the width of the finger and by means of the resilient action provided by the slit 35 and the cut out portion 37 it should retain the article thereto.

Now the bushings 21 are fed in the feeding chute 7 with either end standing up. These bushings are received in the notches 19 of the turntable 3 and are conveyed according to the direction indicated by the arrow 39 against the flange 23. At the same time, the rotor 5 rotates synchronously with the turntable 3 by means of special synchronous device contained within the enclosure 41.

Figure 2:
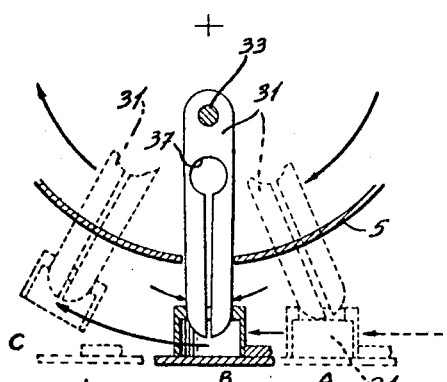
FIGURE 2 is a view on the spring loaded finger of the device according to FIGURE 1 shown picking up a reversed bushing.
Figure 3:
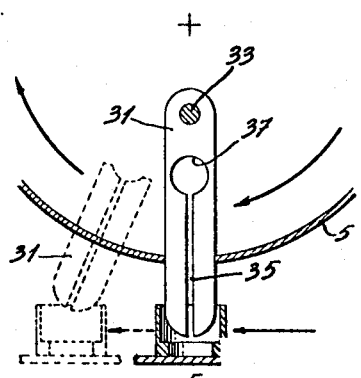
FIGURE 3 is a view of the same spring loaded finger being freely inserted in a bushing standing head up.

The invention will now be best understood with reference to FIGURES 2 and 3. As a bushing with a small diameter up advances on the turntable 3, the respective positions of the spring loaded finger 31 and of the bushing 21 could be represented by the successive positions A, B and C in FIGURE 2. Position A is when the spring loaded finger 31 comes into contact with the reversed bushing 21. As the bushing 21 is further conveyed along the flange 23 of the turntable 3 and as the spring loaded finger 31 is further rotated, the two elements will adopt the position B illustrated in FIGURE 2. Now, in this position B, the spring loaded finger 31 is snugly inserted into the small opening of the bushing 21 since this opening has a smaller diameter than the width of the spring loaded finger 31. By the resilient action of the loaded finger 31, the bushing 21 is retained at the end thereof. A further rotation of the rotor 5 should bring the bushings 21 and the spring loaded finger 31 in the position C illustrated in FIGURE 2. Upon further rotation of the rotor 5 the spring loaded finger having mounted at the outer end thereof the bushing 21 will finally occupy the position D shown in FIGURE 1. Upon further rotation of the rotor 5 the spring loaded finger will pass through the slot 43 but the bushing 21 will be retained by the floor 44 of the feeding chute 11 and will be returned as illustrated by the arrows 45 and 47 into the discarding chute 9.

If a bushing 21 is received into one of the notches 19 in the upstanding position with a larger diameter up, the spring loaded finger will eventually adopt the position E illustrated in FIGURE 3 inside the bushing, but as the diameter of the bushing is longer than the width of the spring loaded finger, it will not be picked up by the spring loaded finger and it will be conveyed by the turntable 3 up to the guide blade 25 and discarded into the discarding chute 9.

Although specific embodiments of this invention have just been described, it is understood that modifications are permissible within the spirit of the invention the scope of which is to be determined by the appended claims only.

I claim:
1. In a machine for conveying upright articles wherein some of the said articles are conveyed head down in reversed position, a device for inverting said reversed articles comprising:
  (a) a horizontal turntable formed with means at the periphery thereof, for conveying upright articles;
  (b) a vertical rotor disposed above the periphery of the said turntable;
  (c) means at the periphery of said rotor for gripping reversed articles as the latter move beneath the said rotor, the said reversed articles to be thus brought into rotation by said rotor;
  (d) means to feed upright articles to said turntable and means to discharge the said articles from said turntable; said feeding and discharge means disposed on either side of said rotor; and
  (e) releasing means at the top of said rotor for freeing the gripped articles from said gripping means, said means including carrying means to carry the released articles into said discharge means.

2. A machine as defined in claim 1, comprising means for simultaneously operating the said turntable and the said rotor.

3. A machine as defined in claim 1, said means for conveying upright articles comprising notches formed in the said turntable into which the said articles are received and a fixed circular flange against which the said articles are conveyed, while being imprisoned in the said notches, when the said turntable is rotated.

4. A machine as defined in claim 3, said feeding means comprising a feeding chute and an opening in the said fixed circular flange through which the said articles penetrate from the feeding chute onto the said turntable.

5. A machine as defined in claim 3, said discharge means comprising an opening in the said circular flange, a guide blade for releasing said articles from said notches and a discarding chute for receiving said released articles.

6. A machine as defined in claim 8, wherein said reversed articles comprise upstanding bushing having a large diameter end and a small diameter end and wherein the said bushings are conveyed with their small diameter facing up in reversed position, the gripping means then constituting of spring loaded fingers so constructed and arranged that when the said spring loaded finger is inserted into the smaller end of the bushing the said bushing is picked up by said spring loaded finger, but when the said spring loaded finger is inserted into the larger end of the said bushing, the said bushing is not picked up by the said spring loaded finger.

7. A machine as defined in claim 6, wherein said spring loaded finger is an elongated blade formed with a slit extending from the outer end of the said spring loaded finger and terminated into a substantially circular cutout portion.

8. A machine as defined in claim 7, said carrying means comprising a return chute having a slot therein through which the loaded finger passes while releasing the bushing in the said return chute.

References Cited

UNITED STATES PATENTS

| 233,062 | 10/1880 | Barlow | 193—43 |
| 2,661,866 | 12/1953 | Lubbert et al. | 221—166 |
| 2,806,494 | 9/1957 | Kull | 221—162 |
| 3,268,114 | 8/1966 | Newton | 221—166 |

FOREIGN PATENTS 460,901  10/1913  France

ANDRES H. NIELSEN, *Primary Examiner.*

U.S. Cl. X.R.
193—43; 221—166